United States Patent
Line et al.

(10) Patent No.: US 9,573,528 B1
(45) Date of Patent: Feb. 21, 2017

(54) INTEGRATED SEATBACK STORAGE

(71) Applicant: Ford Global Technologies, LLC, Dearborn, MI (US)

(72) Inventors: Johnathan Andrew Line, Northville, MI (US); Sean David Fannin, Taylor, MI (US); Keith Allen Godin, Dearborn, MI (US); Marcos Silva Kondrad, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/835,146

(22) Filed: Aug. 25, 2015

(51) Int. Cl.
*A47C 7/62* (2006.01)
*B60R 7/00* (2006.01)

(52) U.S. Cl.
CPC .................................. *B60R 7/005* (2013.01)

(58) Field of Classification Search
CPC ..................................................... B60R 7/005
USPC ......................... 297/188.01, 188.04, 188.06, 188.07, 297/188.2, 188.21
See application file for complete search history.

(56) References Cited

U.S. PATENT DOCUMENTS

| | | |
|---|---|---|
| 2,958,369 A | 11/1960 | Pitts et al. |
| 3,403,938 A | 10/1968 | Cramer et al. |
| 3,929,374 A | 12/1975 | Hogan et al. |
| 4,324,431 A | 4/1982 | Murphy et al. |
| 4,334,709 A | 6/1982 | Akiyama et al. |
| 4,353,595 A | 10/1982 | Kaneko et al. |
| 4,541,669 A | 9/1985 | Goldner |
| 4,629,248 A | 12/1986 | Mawbey |
| 4,676,548 A * | 6/1987 | Bradbury .................. A45F 4/02 297/188.04 X |
| 4,720,141 A | 1/1988 | Sakamoto et al. |
| 4,836,369 A * | 6/1989 | Pickering .................. B65F 1/08 297/188.07 X |

(Continued)

FOREIGN PATENT DOCUMENTS

| | | |
|---|---|---|
| EP | 0754590 | 1/1997 |
| EP | 0926969 | 1/2002 |

(Continued)

OTHER PUBLICATIONS

M. Grujicic et al., "Seat-cushion and soft-tissue material modeling and a finite element investigation of the seating comfort for passenger-vehicle occupants," Materials and Design 30 (2009) 4273-4285.

(Continued)

*Primary Examiner* — Rodney B White
(74) *Attorney, Agent, or Firm* — Vichit Chea; Price Heneveld LLP

(57) ABSTRACT

A vehicle seating assembly includes a rear panel having an outer surface. A rear pocket is defined by a recess in the rear panel. A rigid polymeric rear door is disposed over the rear pocket and is operable between an open position and a closed position. An outer surface of the rear door is flush with the outer surface of the rear panel when in the closed position. A side pocket is defined by a recess on an inboard side of a vehicle seatback. A rigid polymeric side pocket door is operable between an open position and a closed position. An outer surface of the side pocket door is flush with the outer surface of the rear panel when in the closed position. Flexible sidewalls are disposed between a body and the side pocket door. The flexible sidewalls are constructed from a flexible fabric.

17 Claims, 8 Drawing Sheets

(56) References Cited

U.S. PATENT DOCUMENTS

| | | | |
|---|---|---|---|
| 4,915,447 A | 4/1990 | Shovar | |
| 5,004,295 A * | 4/1991 | Inoue | B60N 2/44 297/188.07 |
| 5,171,062 A | 12/1992 | Courtois | |
| 5,174,526 A | 12/1992 | Kanigowski | |
| 5,292,174 A * | 3/1994 | Ohnuma | B60R 7/043 297/188.06 |
| 5,295,732 A * | 3/1994 | Boisset | B60N 2/70 297/188.04 |
| 5,358,307 A * | 10/1994 | Shafer | B60R 7/043 297/188.01 X |
| 5,507,556 A * | 4/1996 | Dixon | B60N 2/4876 297/188.04 |
| 5,518,294 A | 5/1996 | Ligon, Sr. et al. | |
| 5,560,681 A | 10/1996 | Dixon et al. | |
| 5,647,635 A | 7/1997 | Aumond et al. | |
| 5,713,627 A * | 2/1998 | De Filippo | B60R 7/12 297/188.04 X |
| 5,755,493 A | 5/1998 | Kodaverdian | |
| 5,769,489 A | 6/1998 | Dellanno | |
| 5,826,938 A | 10/1998 | Yanase et al. | |
| 5,836,648 A | 11/1998 | Karschin et al. | |
| 5,902,014 A | 5/1999 | Dinkel et al. | |
| 5,913,568 A | 6/1999 | Brightbill et al. | |
| 5,951,039 A | 9/1999 | Severinski et al. | |
| 6,024,406 A | 2/2000 | Charras et al. | |
| 6,059,358 A * | 5/2000 | Demick | B60N 2/206 297/188.07 X |
| 6,062,642 A | 5/2000 | Sinnhuber et al. | |
| 6,145,925 A | 11/2000 | Eksin et al. | |
| 6,155,593 A | 12/2000 | Kimura et al. | |
| 6,179,379 B1 | 1/2001 | Andersson | |
| 6,189,966 B1 | 2/2001 | Faust et al. | |
| 6,196,627 B1 | 3/2001 | Faust et al. | |
| 6,206,466 B1 | 3/2001 | Komatsu | |
| 6,217,062 B1 | 4/2001 | Breyvogel et al. | |
| 6,220,661 B1 | 4/2001 | Peterson | |
| 6,224,150 B1 | 5/2001 | Eksin et al. | |
| 6,296,308 B1 | 10/2001 | Cosentino et al. | |
| 6,312,050 B1 | 11/2001 | Eklind | |
| 6,364,414 B1 | 4/2002 | Specht | |
| 6,375,269 B1 | 4/2002 | Maeda et al. | |
| 6,394,546 B1 | 5/2002 | Knoblock et al. | |
| 6,450,571 B1 | 9/2002 | Canni et al. | |
| 6,454,353 B1 | 9/2002 | Knaus | |
| 6,523,892 B1 | 2/2003 | Kage et al. | |
| 6,550,856 B1 | 4/2003 | Ganser et al. | |
| 6,565,150 B2 | 5/2003 | Fischer et al. | |
| 6,619,605 B2 | 9/2003 | Lambert | |
| 6,682,140 B2 | 1/2004 | Minuth et al. | |
| 6,695,406 B2 | 2/2004 | Plant | |
| 6,698,832 B2 | 3/2004 | Boudinot | |
| 6,702,375 B1 * | 3/2004 | Laskowski | B60N 2/206 297/188.07 X |
| 6,736,452 B2 | 5/2004 | Aoki et al. | |
| 6,758,522 B2 | 7/2004 | Ligon, Sr. et al. | |
| 6,808,230 B2 | 10/2004 | Buss et al. | |
| 6,824,212 B2 | 11/2004 | Malsch et al. | |
| 6,848,742 B1 | 2/2005 | Aoki et al. | |
| 6,860,559 B2 | 3/2005 | Schuster, Sr. et al. | |
| 6,860,564 B2 | 3/2005 | Reed et al. | |
| 6,866,339 B2 | 3/2005 | Itoh | |
| 6,869,140 B2 | 3/2005 | White et al. | |
| 6,890,029 B2 | 5/2005 | Svantesson | |
| 6,938,953 B2 | 9/2005 | Håland et al. | |
| 6,955,399 B2 | 10/2005 | Hong | |
| 6,962,392 B2 | 11/2005 | O'Connor | |
| 6,971,716 B2 * | 12/2005 | DePaulis | B60N 2/60 297/188.07 X |
| 6,988,770 B2 | 1/2006 | Witchie | |
| 6,997,473 B2 | 2/2006 | Tanase et al. | |
| 7,040,699 B2 | 5/2006 | Curran et al. | |
| 7,100,992 B2 | 9/2006 | Bargheer et al. | |
| 7,131,694 B1 | 11/2006 | Buffa | |
| 7,159,934 B2 | 1/2007 | Farquhar et al. | |
| 7,185,950 B2 | 3/2007 | Pettersson et al. | |
| 7,213,876 B2 | 5/2007 | Stoewe | |
| 7,229,118 B2 | 6/2007 | Saberan et al. | |
| 7,261,371 B2 | 8/2007 | Thunissen et al. | |
| 7,300,105 B2 * | 11/2007 | Jasinski, II | B60N 3/004 297/188.07 X |
| 7,344,189 B2 | 3/2008 | Reed et al. | |
| 7,350,859 B2 | 4/2008 | Klukowski | |
| 7,393,005 B2 | 7/2008 | Inazu et al. | |
| 7,425,034 B2 | 9/2008 | Bajic et al. | |
| 7,441,838 B2 | 10/2008 | Patwardhan | |
| 7,455,204 B2 * | 11/2008 | Lippert | B60R 7/043 224/275 |
| 7,467,823 B2 | 12/2008 | Hartwich | |
| 7,478,869 B2 | 1/2009 | Lazanja et al. | |
| 7,481,489 B2 | 1/2009 | Demick | |
| 7,506,924 B2 | 3/2009 | Bargheer et al. | |
| 7,506,938 B2 | 3/2009 | Brennan et al. | |
| 7,530,633 B2 | 5/2009 | Yokota et al. | |
| 7,543,888 B2 | 6/2009 | Kuno | |
| 7,578,552 B2 | 8/2009 | Bajic et al. | |
| 7,597,398 B2 | 10/2009 | Lindsay | |
| 7,611,183 B2 * | 11/2009 | Burkey | B60N 2/206 297/188.07 X |
| 7,611,198 B2 * | 11/2009 | Schweizer | B60N 2/4876 297/188.07 X |
| 7,614,693 B2 | 11/2009 | Ito | |
| 7,641,281 B2 | 1/2010 | Grimm | |
| 7,669,925 B2 | 3/2010 | Beck et al. | |
| 7,669,928 B2 | 3/2010 | Snyder | |
| 7,712,833 B2 | 5/2010 | Ueda | |
| 7,717,459 B2 | 5/2010 | Bostrom et al. | |
| 7,726,733 B2 | 6/2010 | Balser et al. | |
| 7,735,932 B2 | 6/2010 | Lazanja et al. | |
| 7,752,720 B2 | 7/2010 | Smith | |
| 7,753,451 B2 | 7/2010 | Maebert et al. | |
| 7,775,602 B2 | 8/2010 | Lazanja et al. | |
| 7,784,863 B2 | 8/2010 | Fallen | |
| 7,802,843 B2 | 9/2010 | Andersson et al. | |
| 7,819,470 B2 | 10/2010 | Humer et al. | |
| 7,823,971 B2 | 11/2010 | Humer et al. | |
| 7,845,729 B2 | 12/2010 | Yamada et al. | |
| 7,857,381 B2 | 12/2010 | Humer et al. | |
| 7,871,126 B2 | 1/2011 | Becker et al. | |
| 7,891,701 B2 | 2/2011 | Tracht et al. | |
| 7,909,360 B2 | 3/2011 | Marriott et al. | |
| 7,931,294 B2 | 4/2011 | Okada et al. | |
| 7,931,330 B2 | 4/2011 | Itou et al. | |
| 7,946,649 B2 | 5/2011 | Galbreath et al. | |
| 7,963,553 B2 | 6/2011 | Huynh et al. | |
| 7,963,595 B2 | 6/2011 | Ito et al. | |
| 7,963,600 B2 | 6/2011 | Alexander et al. | |
| 7,971,931 B2 | 7/2011 | Lazanja et al. | |
| 7,971,937 B2 | 7/2011 | Ishii et al. | |
| 8,011,726 B2 | 9/2011 | Omori et al. | |
| 8,016,355 B2 | 9/2011 | Ito et al. | |
| 8,029,055 B2 | 10/2011 | Hartlaub | |
| 8,038,222 B2 | 10/2011 | Lein et al. | |
| 8,075,053 B2 | 12/2011 | Tracht et al. | |
| 8,109,569 B2 | 2/2012 | Mitchell | |
| 8,123,246 B2 | 2/2012 | Gilbert et al. | |
| 8,128,167 B2 | 3/2012 | Zhong et al. | |
| 8,141,948 B2 * | 3/2012 | Cassellia | B60K 35/00 297/188.04 |
| 8,152,234 B2 * | 4/2012 | Terleski | B64D 11/0636 297/188.04 |
| 8,162,391 B2 | 4/2012 | Lazanja et al. | |
| 8,162,397 B2 | 4/2012 | Booth et al. | |
| 8,167,370 B2 | 5/2012 | Arakawa et al. | |
| 8,210,568 B2 | 7/2012 | Ryden et al. | |
| 8,210,605 B2 | 7/2012 | Hough et al. | |
| 8,210,611 B2 | 7/2012 | Aldrich et al. | |
| 8,226,165 B2 | 7/2012 | Mizoi | |
| 8,342,607 B2 | 1/2013 | Hofmann et al. | |
| 2004/0195870 A1 | 10/2004 | Bohlender et al. | |
| 2005/0200166 A1 | 9/2005 | Noh | |
| 2006/0043777 A1 | 3/2006 | Friedman et al. | |
| 2007/0120401 A1 | 5/2007 | Minuth et al. | |

(56) References Cited

U.S. PATENT DOCUMENTS

| | | |
|---|---|---|
| 2008/0174159 A1 | 7/2008 | Kojima et al. |
| 2008/0252111 A1* | 10/2008 | Rothkop .............. B60N 3/004 297/188.04 |
| 2009/0066122 A1 | 3/2009 | Minuth et al. |
| 2009/0165263 A1 | 7/2009 | Smith |
| 2009/0322124 A1 | 12/2009 | Barkow et al. |
| 2010/0007122 A1 | 1/2010 | Clauser et al. |
| 2010/0038937 A1 | 2/2010 | Andersson et al. |
| 2010/0140986 A1 | 6/2010 | Sawada |
| 2010/0171346 A1 | 7/2010 | Laframboise et al. |
| 2010/0187881 A1 | 7/2010 | Fujita et al. |
| 2010/0201167 A1 | 8/2010 | Wieclawski |
| 2010/0231013 A1 | 9/2010 | Schlenker |
| 2010/0244505 A1* | 9/2010 | Demick .............. B60N 2/4876 297/188.04 |
| 2010/0270840 A1 | 10/2010 | Tanaka et al. |
| 2010/0301650 A1 | 12/2010 | Hong |
| 2010/0320816 A1 | 12/2010 | Michalak |
| 2011/0018498 A1 | 1/2011 | Soar |
| 2011/0074185 A1 | 3/2011 | Nakaya et al. |
| 2011/0095513 A1 | 4/2011 | Tracht et al. |
| 2011/0095578 A1 | 4/2011 | Festag |
| 2011/0109127 A1 | 5/2011 | Park et al. |
| 2011/0109128 A1 | 5/2011 | Axakov et al. |
| 2011/0121624 A1 | 5/2011 | Brncick et al. |
| 2011/0133525 A1 | 6/2011 | Oota |
| 2011/0163574 A1 | 7/2011 | Tame et al. |
| 2011/0163583 A1 | 7/2011 | Zhong et al. |
| 2011/0186560 A1 | 8/2011 | Kennedy et al. |
| 2011/0187174 A1 | 8/2011 | Tscherbner |
| 2011/0198896 A1* | 8/2011 | Brinster .............. B60R 7/005 297/188.06 |
| 2011/0254335 A1 | 10/2011 | Pradier et al. |
| 2011/0260506 A1 | 10/2011 | Kuno |
| 2011/0272548 A1 | 11/2011 | Rudkowski et al. |
| 2011/0272978 A1 | 11/2011 | Nitsuma |
| 2011/0278885 A1 | 11/2011 | Procter et al. |
| 2011/0278886 A1 | 11/2011 | Nitsuma |
| 2011/0298261 A1 | 12/2011 | Holt et al. |
| 2012/0032486 A1 | 2/2012 | Baker et al. |
| 2012/0037754 A1 | 2/2012 | Kladde |
| 2012/0063081 A1 | 3/2012 | Grunwald |
| 2012/0080914 A1 | 4/2012 | Wang |
| 2012/0091695 A1 | 4/2012 | Richez et al. |
| 2012/0091766 A1 | 4/2012 | Yamaki et al. |
| 2012/0091779 A1 | 4/2012 | Chang et al. |
| 2012/0109468 A1 | 5/2012 | Baumann et al. |
| 2012/0119551 A1 | 5/2012 | Brncick et al. |
| 2012/0125959 A1 | 5/2012 | Kucera |
| 2012/0127643 A1 | 5/2012 | Mitchell |
| 2012/0129440 A1 | 5/2012 | Kitaguchi et al. |
| 2012/0162891 A1 | 6/2012 | Tranchina et al. |
| 2012/0175924 A1 | 7/2012 | Festag et al. |
| 2012/0187729 A1 | 7/2012 | Fukawatase et al. |
| 2012/0248833 A1 | 10/2012 | Hontz et al. |
| 2012/0261974 A1 | 10/2012 | Yoshizawa et al. |
| 2013/0076092 A1 | 3/2013 | Kulkarni et al. |
| 2013/0119741 A1 | 5/2013 | Medoro et al. |
| 2014/0042781 A1* | 2/2014 | Reeves ................. B60N 3/004 297/188.07 X |
| 2014/0284972 A1* | 9/2014 | Riedel ............... B64D 11/0015 297/188.04 |
| 2015/0001898 A1* | 1/2015 | Line ...................... B60R 7/043 297/188.1 |
| 2015/0001899 A1* | 1/2015 | Line .................... B60N 2/4802 297/188.04 |
| 2015/0035325 A1* | 2/2015 | Gagnier ................. B60R 7/043 297/188.04 |
| 2016/0107582 A1* | 4/2016 | Dry ......................... B60N 2/64 297/188.07 |

FOREIGN PATENT DOCUMENTS

| | | |
|---|---|---|
| EP | 1266794 | 3/2004 |
| EP | 1123834 | 10/2004 |
| EP | 1050429 | 10/2005 |
| EP | 1084901 | 6/2006 |
| EP | 1674333 | 8/2007 |
| EP | 1950085 | 12/2008 |
| EP | 1329356 | 11/2009 |
| JP | 201178557 A | 4/2011 |
| WO | WO9511818 | 5/1995 |
| WO | WO9958022 | 11/1999 |
| WO | WO2006131189 | 12/2006 |
| WO | WO2007028015 | 8/2007 |
| WO | 2008019981 A1 | 2/2008 |
| WO | WO2008073285 | 6/2008 |
| WO | WO2011021952 | 2/2011 |
| WO | WO2012008904 | 1/2012 |

OTHER PUBLICATIONS

"Thigh Support for Tall Drivers," http://cars.about.com/od/infiniti/ig/2009-Infiniti-G37-Coupe-pics/2008-G37-cpe-thigh-support.htm (1 page), 2009.

Mladenov, "Opel Insignia Receives Seal of Approval for Ergonomic Seats," Published Aug. 27, 2008, http://www.automobilesreview.com/auto-news/opel-insignia-receives-seal-of-approval-for-ergonomic-seats/4169/ (2 pages).

Brose India Automotive Systems, "Adaptive Sensor Controlled Headrest," http://www.indiamart.com/broseindiaautomotivesystems/products.html, Oct. 9, 2012 (12 pages).

eCOUSTICS.COM, "Cineak Motorized Articulating Headrest Preview," http://www.ecoustics.com/ah/reviews/furniture/accessories/cineak-motorized-headrest, Oct. 9, 2012 (3 pages).

"Performance' Car Seat Eliminates Steel," Published in Plastics News—Indian Edition Plastics & Polymer News, (http://www.plasticsinfomart.com/performance-car-seat-eliminates-steel/), Jan. 2012, 3 pages.

"Frankfurt 2009 Trend—Light and Layered." by Hannah Macmurray, Published in GreenCarDesign, (http://www.greencardesign.com/site/trends/00138-frankfurt-2009-trend-light-and-layered), Sep. 2009, 9 pages.

"Imola Pro-fit", Cobra, (http://cobra.subesports.com/products/cat/seats/brand/Cobra/prodID/656), Date unknown, 2 pages.

* cited by examiner

US 9,573,528 B1

INTEGRATED SEATBACK STORAGE

FIELD OF THE DISCLOSURE

The present disclosure generally relates to a vehicle seating assembly, and more particularly to integrated seatback storage for a vehicle seat.

BACKGROUND OF THE DISCLOSURE

Seating assemblies for vehicles are increasingly becoming more adapted for occupant comfort in a variety of vehicle environments and for a number of driver and passenger preferences. These same seating assemblies frequently include increased versatility to create additional options in the way of cargo space. Vehicles generally have storage features so that transported items can be positioned in a safe place. Storage features that take advantage of otherwise unused space are very useful.

SUMMARY OF THE DISCLOSURE

According to one aspect of the present disclosure, a vehicle seating assembly includes a rear panel having an outer surface. A rear pocket is defined by a recess in the rear panel. A rigid polymeric rear door is disposed over the rear pocket and is operable between an open position and a closed position. An outer surface of the rear door is flush with the outer surface of the rear panel when in the closed position. A side pocket is defined by a recess on an inboard side of a vehicle seatback. A rigid polymeric side pocket door is operable between an open position and a closed position. An outer surface of the side pocket door is flush with the outer surface of the rear panel when in the closed position. Flexible sidewalls are disposed between the rear panel and the side pocket door. The flexible sidewalls are constructed from a flexible fabric.

According to another aspect of the present disclosure, a vehicle seating assembly includes a rear panel defining a pocket. A rigid rear door is disposed over the pocket. An outer surface of the rear door is flush with an outer surface of the panel when closed. A side door includes flexible sidewalls disposed over a side pocket defined in a side of the seating assembly. An outer surface of the side door is flush with the outer surface of a body when closed.

According to yet another aspect of the present disclosure, a vehicle seating assembly includes a rear panel having an outer surface. A side pocket is defined by a recess on an inboard side of a vehicle seatback. A rigid polymeric side pocket door is operable between open and closed positions. An outer surface of the side pocket door is flush with the outer surface of the rear panel when in the closed position. Flexible sidewalls are disposed between a body and the side pocket door.

According to still another aspect of the present disclosure, a vehicle seating assembly includes a combination rear pocket and inboard side pocket disposed in a hard back panel of the vehicle seating assembly. The rear pocket and the side pocket each include outer surfaces that are flush with an outer surface of the hard back panel. One or both of the pockets may include a rigid polymeric door and flexible sidewalls that can flex outwardly to accommodate stored items.

These and other aspects, objects, and features of the present disclosure will be understood and appreciated by those skilled in the art upon studying the following specification, claims, and appended drawings.

DETAILED DESCRIPTION OF THE EMBODIMENTS

Figure 1:
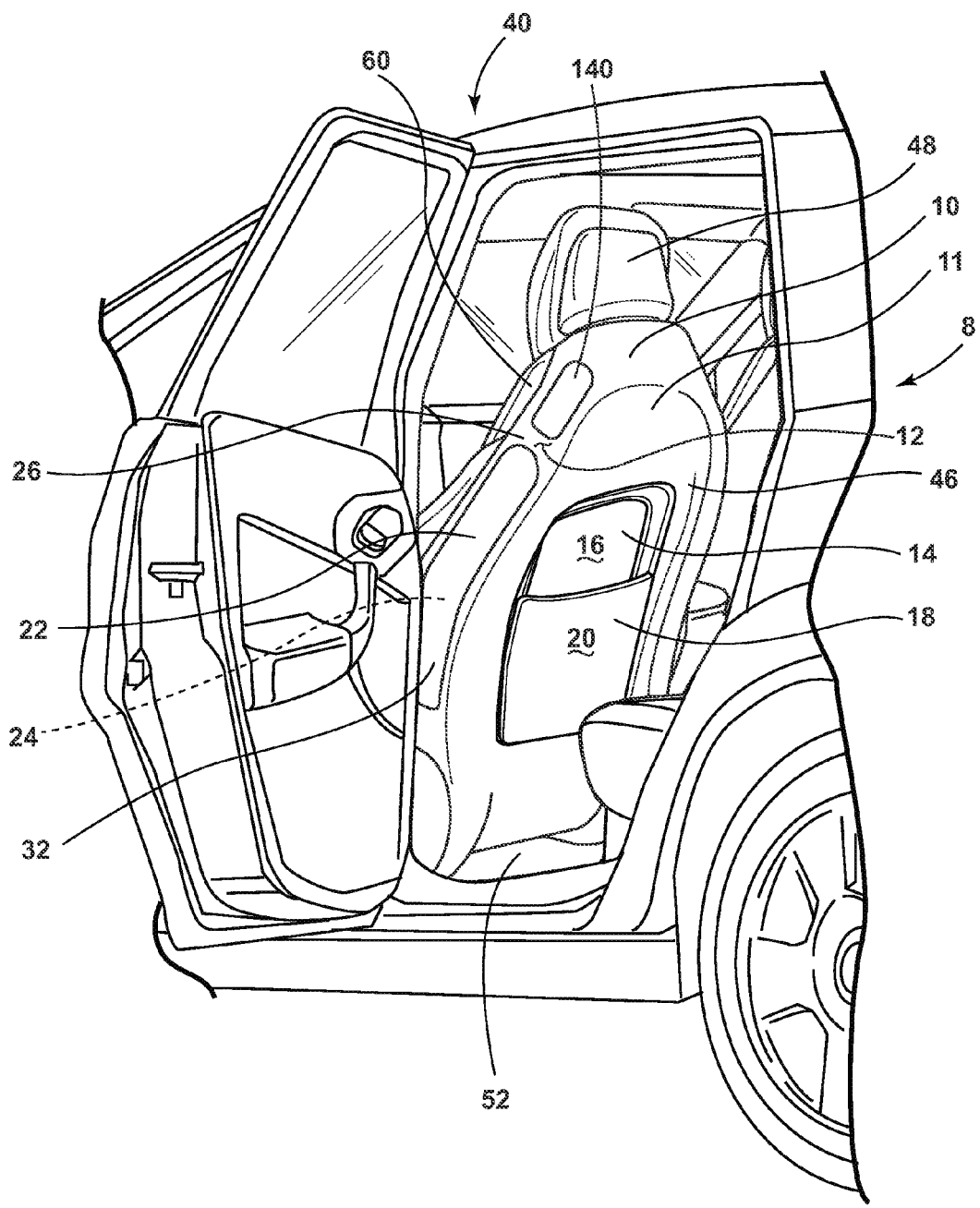
FIG. 1 is a rear perspective view of one embodiment of a vehicle seating assembly of the present disclosure.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to the embodiment generally illustrated in FIGS. 1-6, reference numeral 8 generally designates a vehicle seating assembly having a seatback 10 that includes a rear panel 11 with an outer surface 12. A rear pocket 14 is defined by a recess 16 formed in the rear panel 11. A rigid polymeric rear door 18 is disposed over the rear pocket 14 and is operable between an open position and a closed position. An outer surface 20 of the rear door 18 is flush with the outer surface 12 of the rear panel 11 when in the closed position. A side pocket 22 is defined by a recess 24 on an inboard side 26 of the vehicle seatback 10. A rigid polymeric side pocket door 30 is operable between an open position and a closed position. An outer surface 32 of the side pocket door 30 is flush with the outer surface 12 of the rear panel 11 when in the closed position. Flexible sidewalls 34 are disposed between the rear panel 11 and the side pocket door 30. The flexible sidewalls 34 are constructed from a flexible material.

With reference again to FIGS. 1-1B, the illustrated vehicle seating assembly 8 is generally configured for use in a vehicle 40, such as a car, a van, or a truck. The vehicle seating assembly 8 includes a rail slide assembly 42 that allows for fore and aft movement of the vehicle seating assembly 8 relative to the vehicle 40. In addition, the vehicle seating assembly 8 includes a seat base 44, a seatback 46, and a headrest or a head restraint 48. The vehicle seating assembly 8 has an inner support frame that is fixedly connected to the rail slide assembly 42 secured with a bottom floor 52 of the vehicle 40. In the seat base 44, a frame 50 is disposed below a cushion assembly 54 and wrapped by a lower shroud 56 that includes controls 58 for changing the seat position and general orientation of the vehicle seating assembly 8 relative to the vehicle 40. In the seatback 46, the frame 50 is disposed between a seatback cushion assembly 60 and the rear panel 11.

The rear panel 11, as generally illustrated in FIGS. 1A and 1B, is a single integral one-piece polymeric rear panel configured for concealing the support frame 50, and providing an aesthetically pleasing appearance of the vehicle seating assembly 8 from behind. It is also contemplated that the rear panel 11 may include multiple pieces that are secured together and coupled with the rear portion of the vehicle seating assembly 8.

Figure 2:
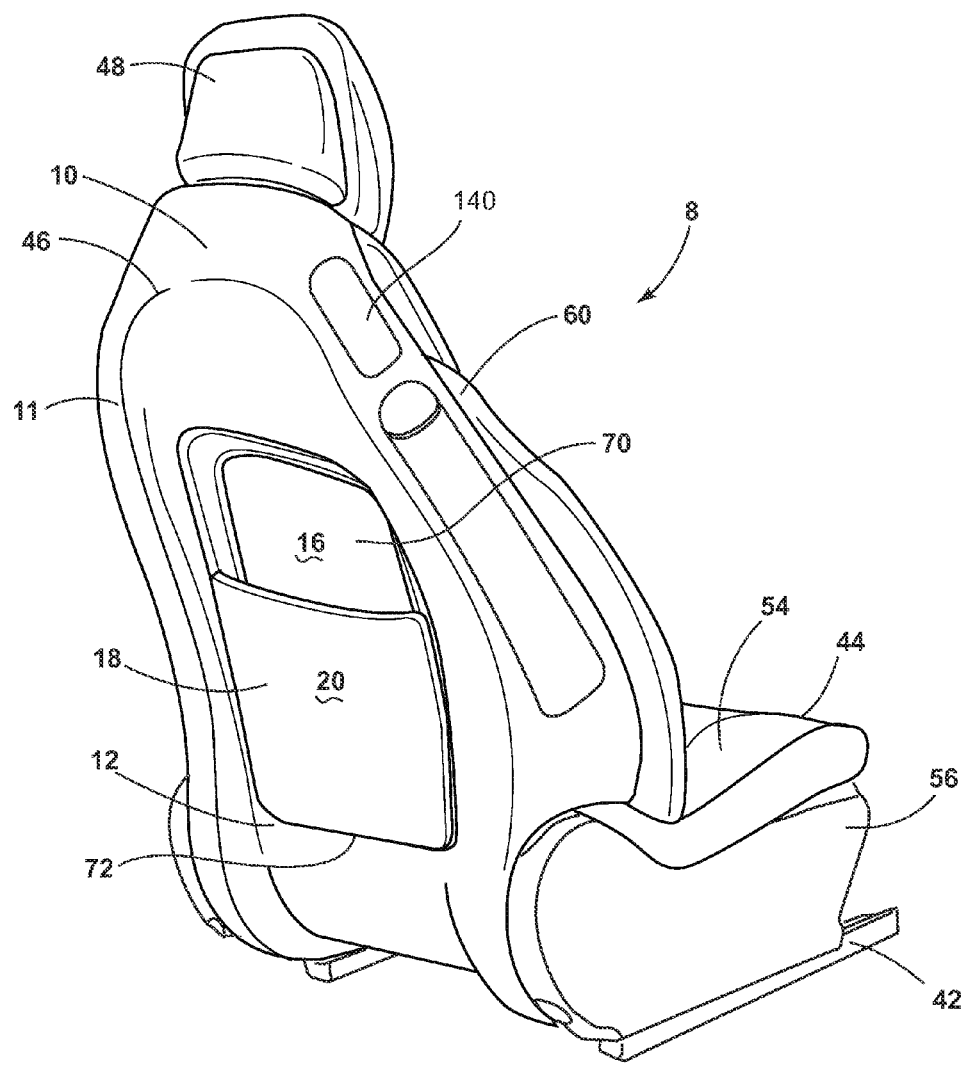
FIG. 2 is a rear perspective view of an inboard side of a vehicle seating assembly with a rear pocket door in a closed position.
Figure 2A:
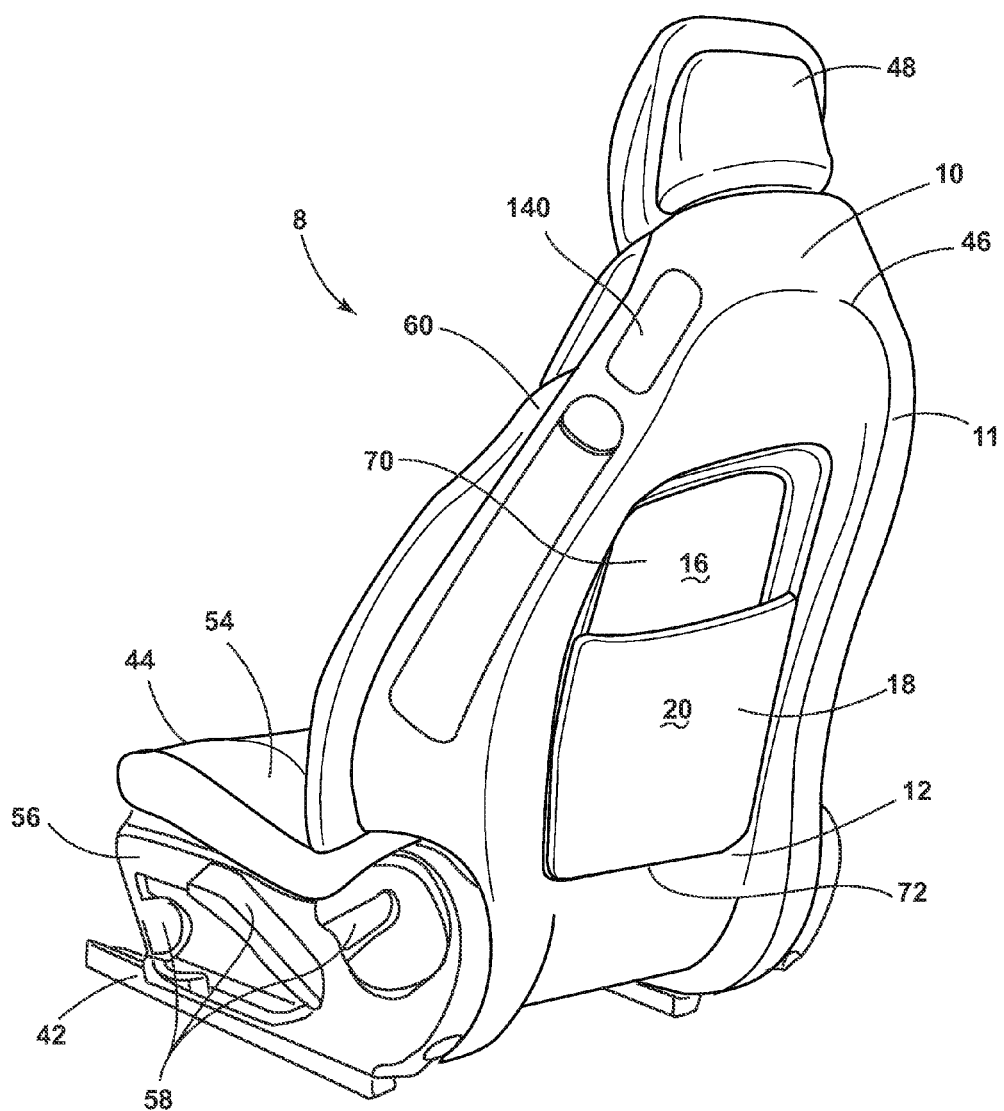
FIG. 2A is a rear perspective view of an outboard side of a vehicle seating assembly with a rear pocket door in a closed position.
Figure 2B:
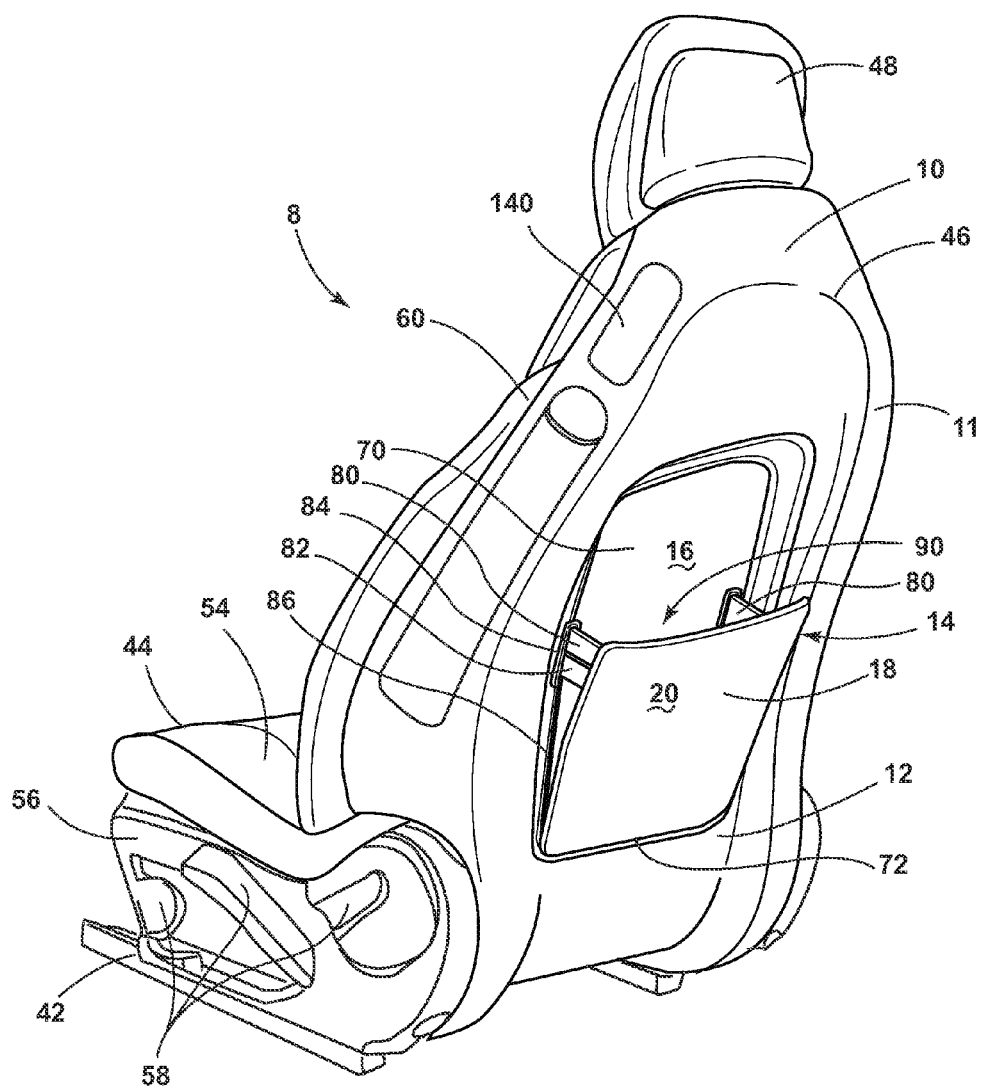
FIG. 2B is a rear perspective view of the vehicle seating assembly of FIG. 2A with the rear pocket door in the open position.

With reference now to FIGS. 2-2B, the rear panel 11 includes at least two pockets in the form of the side pocket 22 and the rear pocket 14. It will be understood that the side pockets 22 and 140 may be positioned on an inboard side of the vehicle seating assembly 10, as shown in FIG. 2 or an outboard side of the vehicle seating assembly 10, as shown in FIGS. 2A and 2B. The general functionality of the side pockets 22 and 140 will be the same in either instance. The rear pocket 14 is disposed in a central portion 70 of the rear panel 11. The recess 16 that generally defines the rear pocket 14 is disposed in the central portion 70 of the rear panel 11, and may extend to a lower region of the rear panel 11 or may extend from a lower region to an upper region of the rear panel 11. Notably, the rear door 18 is configured to rotate about a lower pivot axis 72 on the rear panel 11. The rear door 18 is movable between the opened and closed positions, and as noted above, is generally flush with the outer surface 20 of the rear panel 11 when in the closed position. Accordingly, a relatively seamless appearance is given to the rear panel 11 when the rear door 18 is closed. It is generally contemplated that the rear door 18 will be constructed from a rigid polymeric material that is the same as the rear panel 11. However, it is also contemplated that the rear door 18 may be formed from a different material, such as a metal or a fabric, or a combination thereof.

With reference again to FIGS. 2-2B, the rear door 18 includes sidewalls 80 configured to move forward and rearward, depending on the relative position of the rear door 18. The sidewalls 80 include a guide member 82 disposed on an upper portion of the sidewalls 80. The guide member 82 is configured to move in and out of a slot 84 arranged in a portion of the rear panel 11. The guide member 82 ensures a smooth transition of the rear door 18 between the open and closed positions. It is generally contemplated that the sidewalls 80 of the rear door 18 may be rigid or flexible. In the event that the sidewalls 80 of the rear door 18 are rigid, the sidewalls 80 will be fixedly coupled with the rear door 18 and move relative to the rear panel 11 into the slots 84 defined in the rear panel 11. More specifically, when the rear door 18 is moved to the open position, the sidewalls 80 are drawn from elongate slots 86 defined in the rear panel 11 until stops disposed on one of the rear panel 11 and the sidewalls 80 prohibit any further movement of the rear door 18 relative to the rear panel 11. When moved to the closed position, the sidewalls 80 slide back into the elongate slots 86 defined in the rear panel 11 until the outer surface 20 of the rear door 18 is flush with the outer surface 12 of the rear panel 11. In the event that the sidewalls 80 are formed from a flexible material, it will be generally understood that the sidewalls 80 will flex or fold inward, such that the sidewalls 80 are not exposed when the rear door 18 is in the closed position. It is also contemplated that the sidewalls 80 may be formed from an elastic material that stretches, such that no folding or bending of the sidewalls 80 is necessary.

As generally illustrated in FIGS. 2-2B, the recess 16 extends from a lower portion of the rear panel 11 to an upper portion of the rear panel 11. However, the rear door 18 only extends across a lower portion of the recess 16. It is generally contemplated that the rear door 18 may extend across a full area of the recess 16, or only a bottom portion of the recess 16. As illustrated in FIG. 2, access to an interior area 90 of the rear pocket 14 is available when the rear door 18 is in both the open position and the closed position, the difference being that more access is granted to the interior area 90 of the rear pocket 14 when the rear door 18 is in the open position.

Figure 3:
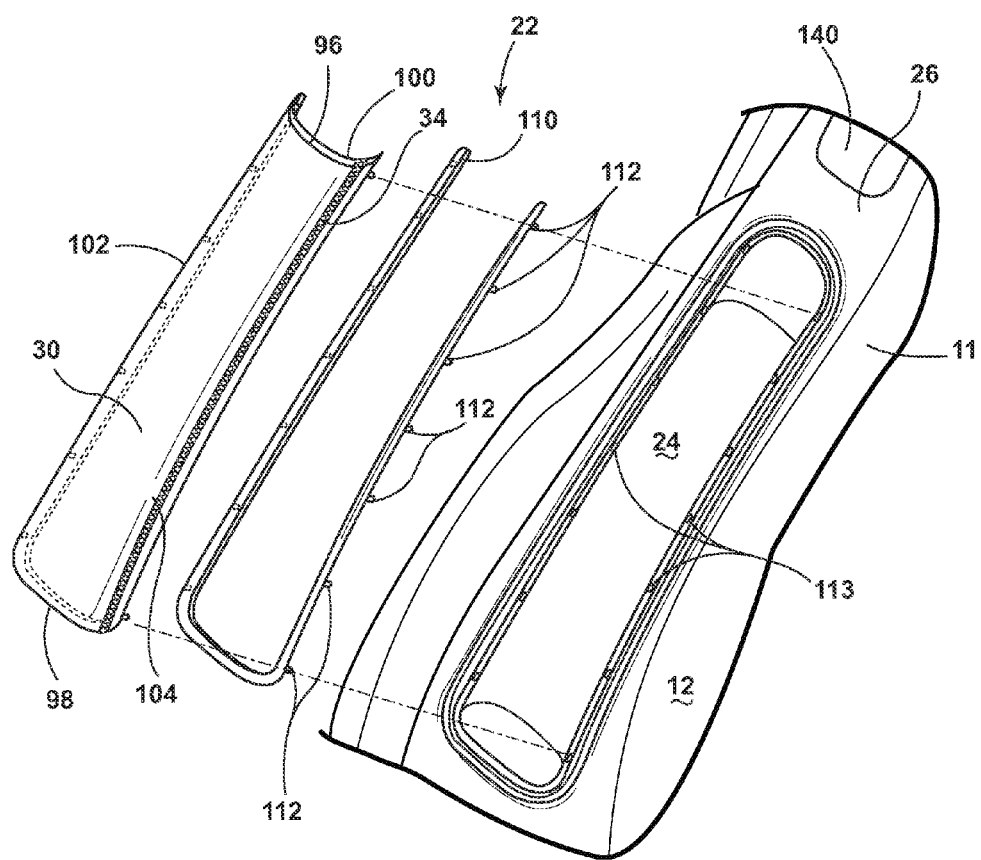
FIG. 3 is an enlarged exploded view of a side pocket of a seatback of a vehicle seating assembly of the present disclosure.
Figure 4:
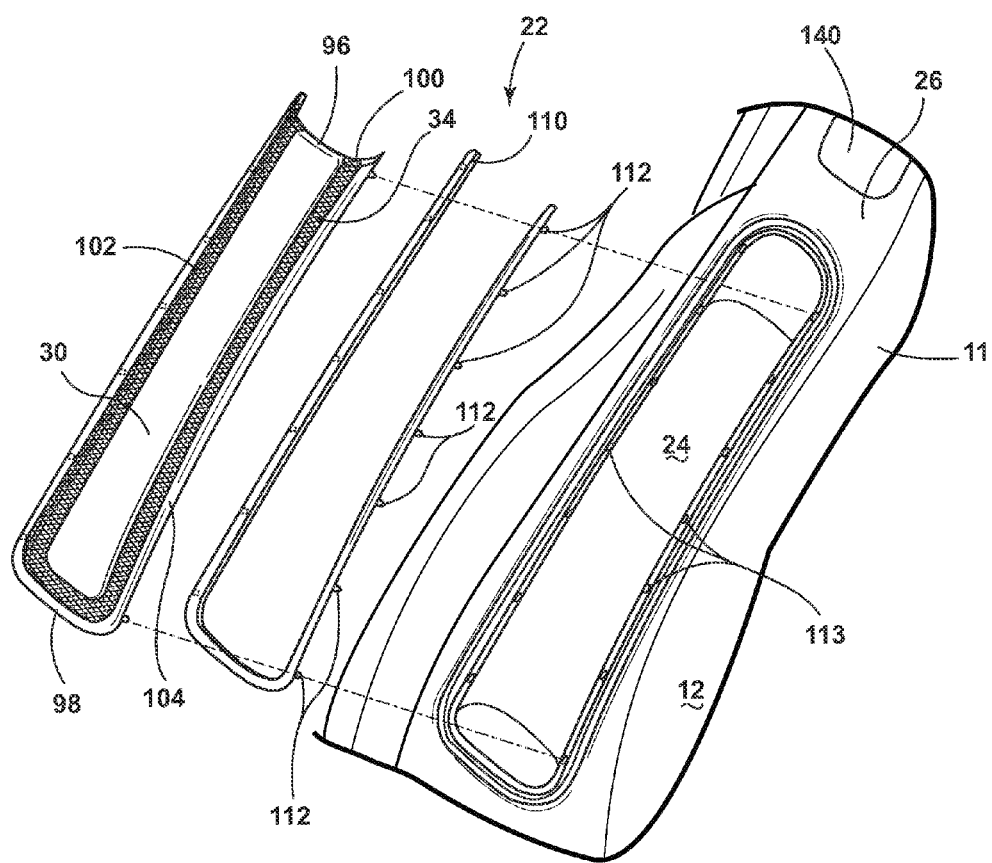
FIG. 4 is another enlarged exploded view of a side pocket of a seatback of a vehicle seating assembly of the present disclosure.

With reference now to FIGS. 3 and 4, the side pocket 22 that is defined by the recess 24 on the inboard side 26 of the vehicle seatback 28 is also configured to be flush with the outer surface 12 of the rear panel 11 when in the closed position. Although the outer surface 32 of the side pocket door 30 may rest flush against the outer surface 12 of the rear panel 11 when in the closed position, the side pocket door 30 may include a small tab 96 or access slot configured to accommodate the fingers of a passenger to move the side pocket door 30 from the closed position to the open position such that a passenger can access an access opening 97. The side pocket door 30 is configured to rotate about one of the sides of the side pocket door 30. Accordingly, the side pocket door 30 may rotate about a bottom side 98 of the side pocket door 30, such that a top side 100 of the side pocket door 30 pivots out away from the rear panel 11. However, it is also contemplated that the side pocket door 30 may rotate about forward or rearward sides 102, 104 of the side pocket door 30, such that when the side pocket door 30 rotates about the rearward side 104 of the side pocket door 30, the forward side 102 of the side pocket door 30 pivots away from the rear panel 11. Conversely, if the side pocket door 30 rotates about the forward side 102 of the side pocket door 30, the rearward side 104 of the side pocket door 30 pivots outward away from the rear panel 11. It is also contemplated that the side pocket door 30 may simply flex outward via the flexible material. In this instance, there is no pivot per se. However, the side pocket door 30 flexes outward as a result of the flexible material in the flexible sidewalls 34.

With reference again to FIGS. 3 and 4, the illustrated side pocket door 30 includes a U-shaped securing ring 110 configured to couple the side pocket door 30 with the rear panel 11. The securing ring 110 generally defines a polymeric rigid rim that is operably coupled with the inboard side 26 of the vehicle seatback 28 via a snap-fit connection. The securing ring 110 may include a plurality of mechanical fasteners 112 configured for permanent or removable connection with fastener apertures 113 in the rear panel 11. Alternatively, the securing ring 110 may include a plurality of receiving apertures configured to receive fasteners extending from the rear panel 11. The securing ring 110 is operably coupled with the stretchable fabric of the flexible sidewalls 34. The stretchable fabric is disposed between the side pocket door 30 and the securing ring 110, and allows the side pocket door 30 to move between open and closed positions relative to the rear panel 11 and the securing ring 110. The flexible fabric may be made of a variety of different fabrics that includes stretchable or flexible characteristics. It is generally contemplated that when the side pocket door 30 moves to the closed position, the side pocket door 30 will be maintained in the closed position by a friction fit, an interference fit, or the like that maintains the side pocket door 30 in the closed position. It will be understood that the U-shaped securing ring 110 will have an open side proximate the access opening 97 of the side pocket door 30. Depending on which side the side pocket door 30 rotates about, the opening in the U-shaped securing ring 110, and consequently the access opening 97, will change. It is generally contemplated that the stretchable fabric may extend only between the U-shaped securing ring 110 and the side pocket door 30, or may extend between the U-shaped securing ring 110 and the side pocket door 30 and line an inner surface of the side pocket door 30. Other constructions are also contemplated.

Figure 5:
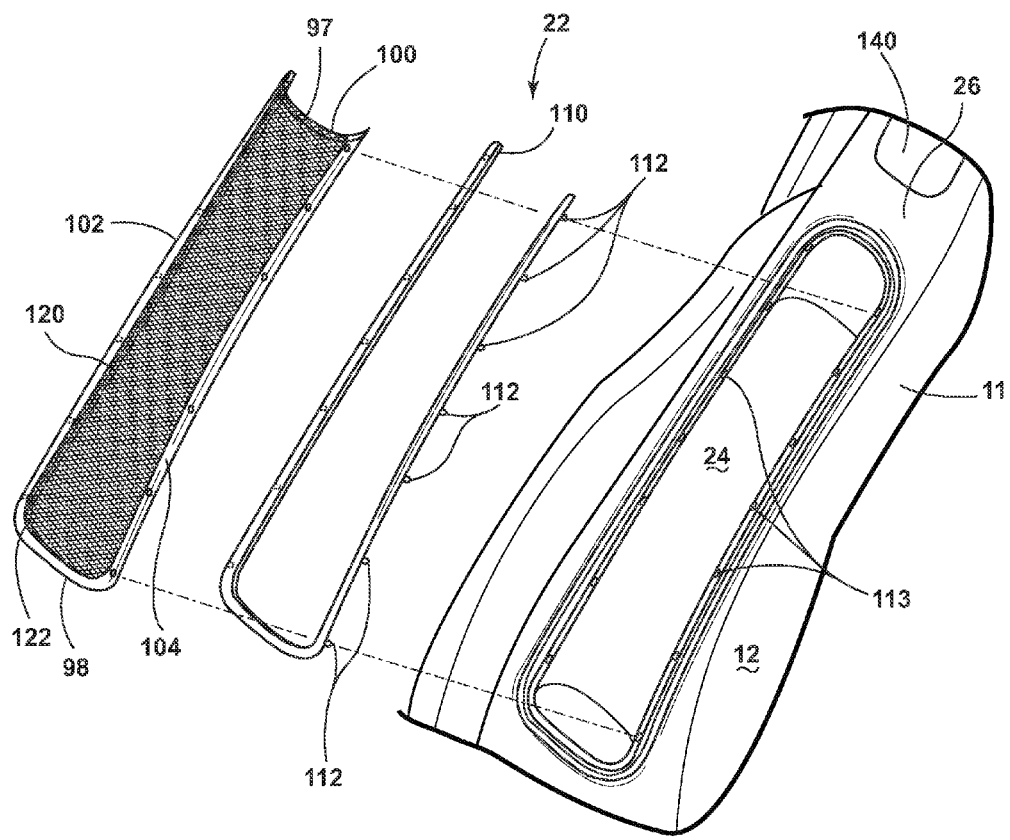
FIG. 5 is yet another enlarged exploded view of a side pocket of a seatback of a vehicle seating assembly of the present disclosure.

With reference now to FIG. 5, an alternative construction is illustrated that includes similar features to those described in FIG. 4. A U-shaped securing ring 110 similar to that discussed above in relation to FIGS. 3 and 4 is provided, but engages a stretchable fabric net 120 with a frame 122. The stretchable fabric net 120 does not include a hard plastic door as set forth in FIGS. 3 and 4. In this instance, the stretchable fabric net 120 is disposed between the three sides of the securing ring 110, but is open on one of the sides proximate the access opening 97. In the illustrated embodiment of FIG. 5, the open side is the top side of the side pocket door 30. The frame 122 may be coupled with the U-shaped securing ring 110 in any of a variety of manners.

Figure 6:
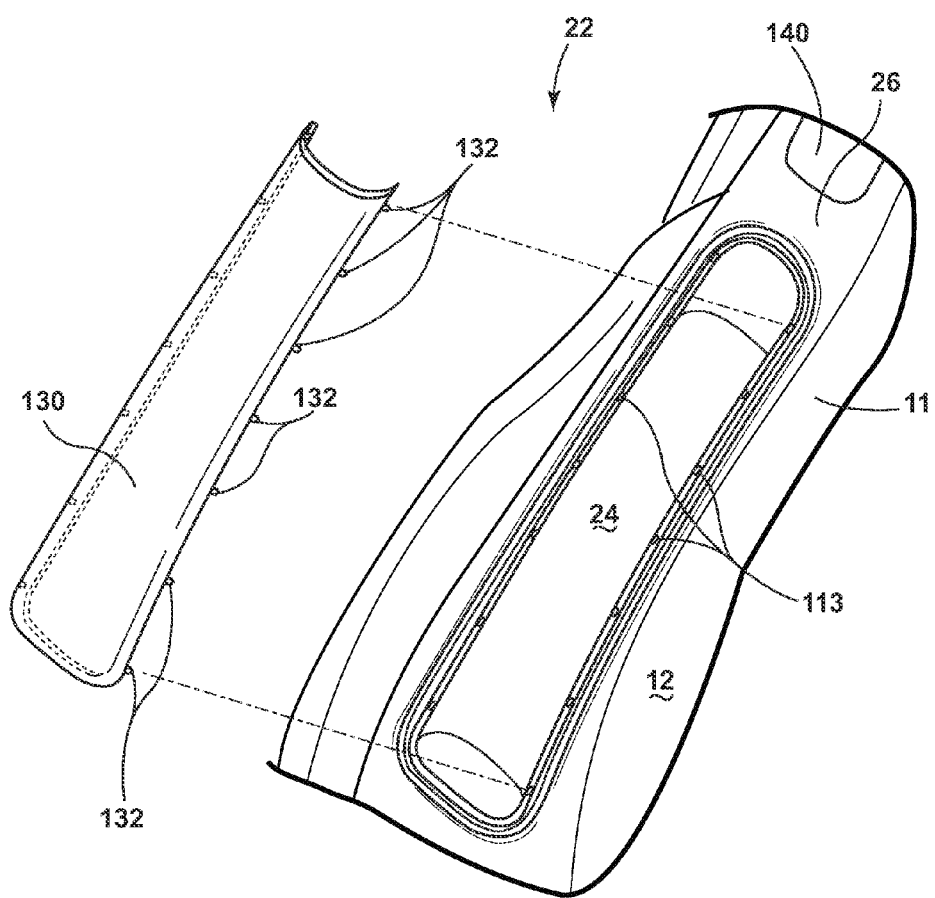
FIG. 6 is still another enlarged exploded view of a side pocket of a seatback of a vehicle seating assembly of the present disclosure.

With reference now to FIG. 6, another alternative construction is illustrated that shows a side pocket door 130 that includes attachment tabs 132. In this instance, a stretchable fabric is not utilized. Rather, a generally rigid polymeric material that constructs the side pocket door 130 is used. The side pocket door 130 directly engages with the rear panel 11, and allows for movement between the open and closed positions. The side pocket door 130 may be snapped on and off, hinge open, slide open, etc.

An additional smaller side pocket 140 may be present on the side of the vehicle seating assembly 8. The smaller side pocket 140 may have features and functionality similar to those described in detail above. The smaller side pocket 140 may be configured to support a flashlight, an umbrella, or other similar shaped items. The smaller side pocket 140 may also include an outer surface flush with the outer surface 12 of the rear panel 11.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or moveable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A vehicle seating assembly comprising:
   a rear panel having an outer surface;
   a rear pocket defined by a recess in the rear panel;
   a rigid polymeric rear door disposed over the rear pocket and operable between an open position and a closed position, wherein an outer surface of the rear door is flush with the outer surface of the rear panel when in the closed position; and a side pocket defined by a recess on an inboard side of a vehicle seatback, wherein the side pocket includes a polymeric rigid rim configured to engage the inboard side of the vehicle seatback;

a rigid polymeric side pocket door operable between an open position and a closed position, wherein an outer surface of the side pocket door is flush with the outer surface of the rear panel when in the closed position; and flexible sidewalls disposed between the rear panel and the side pocket door, the flexible sidewalls being constructed from a flexible fabric.

2. The vehicle seating assembly of claim 1, wherein the flexible sidewalls are disposed between the polymeric rigid rim and the side pocket door.

3. The vehicle seating assembly of claim 1, wherein the polymeric rigid rim includes a U-shaped configuration.

4. The vehicle seating assembly of claim 1, wherein the polymeric rigid rim is operably coupled with the inboard side of the vehicle seatback via a snap-fit connection.

5. The vehicle seating assembly of claim 1, further comprising:

an item retainer disposed above the side pocket.

6. The vehicle seating assembly of claim 1, further comprising:

an inner wall disposed between the flexible sidewalls and inside the side pocket door.

7. A vehicle seating assembly comprising:

a rear panel defining a pocket;

a rigid rear door disposed over the pocket;

an outer surface of the rear door being flush with an outer surface of the panel when closed;

a side door with flexible sidewalls disposed over a side pocket defined in a side of the seating assembly, wherein the side pocket includes a polymeric rigid rim configured to engage an inboard side of a vehicle seatback; and an outer surface of the side door being flush with the outer surface of a body when closed.

8. The vehicle seating assembly of claim 7, further comprising:

a rear pocket defined by a recess in the rear panel.

9. The vehicle seating assembly of claim 8, further comprising:

a rigid polymeric rear door disposed over the side pocket and operable between an open position and a closed position, wherein an outer surface of the rear door is flush with the outer surface of the rear panel when in the closed position.

10. The vehicle seating assembly of claim 7, wherein the flexible sidewalls are disposed between the polymeric rigid rim and the side pocket door.

11. The vehicle seating assembly of claim 7, wherein the polymeric rigid rim includes a U-shaped configuration.

12. The vehicle seating assembly of claim 7, wherein the polymeric rigid rim is operably coupled with the inboard side of the vehicle seatback via a snap-fit connection.

13. The vehicle seating assembly of claim 7, further comprising:

an item retainer disposed above the side pocket.

14. The vehicle seating assembly of claim 7, further comprising:

an inner wall disposed between the flexible sidewalls and inside the side pocket door.

15. A vehicle seating assembly comprising:

a rear panel having an outer surface;

a side pocket including a polymeric rigid rim engaging an inboard side of a seatback;

a rigid polymeric side pocket door operable between open and closed positions, wherein an outer surface of the side pocket door is flush with the outer surface of the rear panel when in the closed position; and flexible sidewalls disposed between a body and the side pocket door.

16. The vehicle seating assembly of claim 15, further comprising:

a rear pocket defined by a recess in the rear panel.

17. The vehicle seating assembly of claim 16, further comprising:

a rigid polymeric rear door disposed over the side pocket and operable between an open position and a closed position, wherein an outer surface of the rear door is flush with the outer surface of the rear panel when in the closed position.

* * * * *